Sept. 18, 1923.
J. D. KIMMEL
TROLLEY WHEEL
Filed June 18, 1923
1,468,503
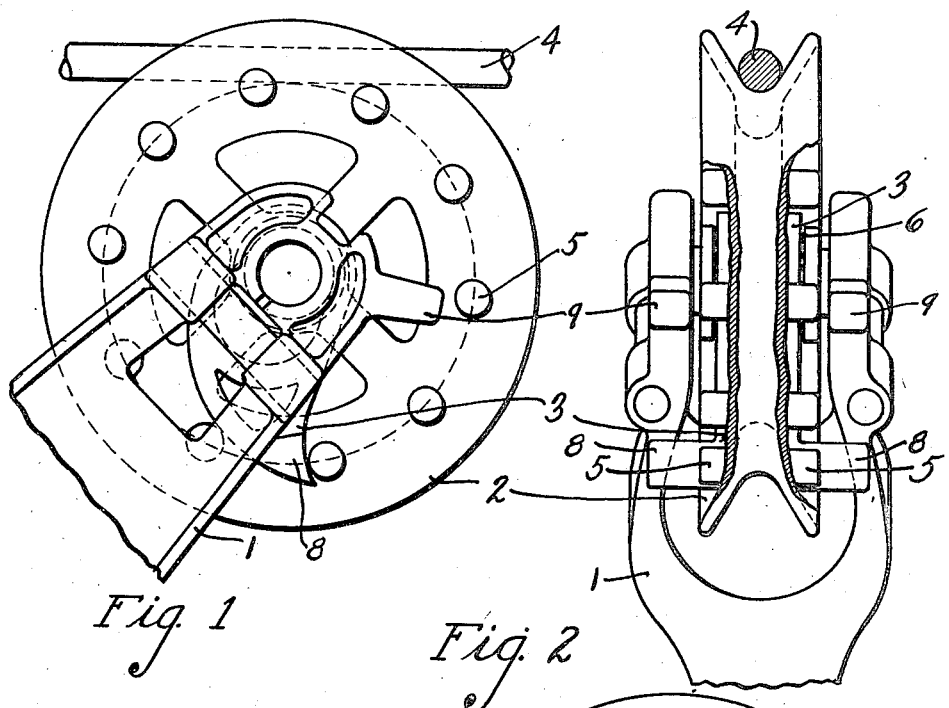
Fig. 1
Fig. 2
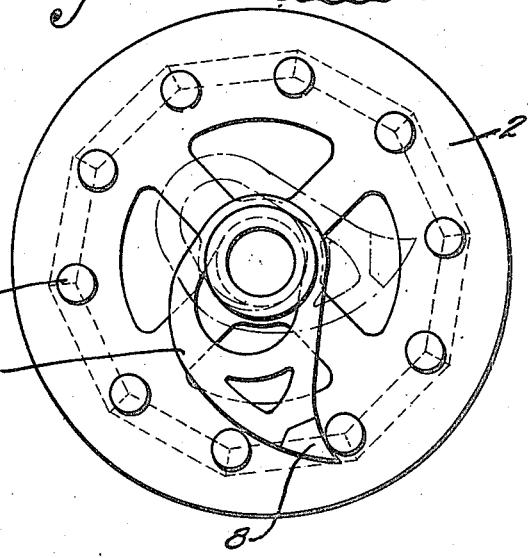
Fig. 3
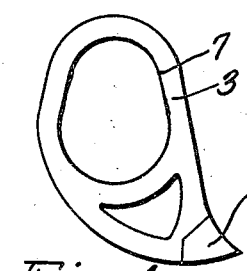
Fig. 4
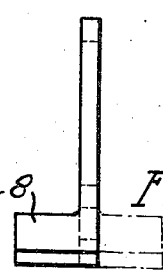
Fig. 5
INVENTOR.
Jess D. Kimmel
BY
ATTORNEY.

Patented Sept. 18, 1923.

1,468,503

UNITED STATES PATENT OFFICE.

JESS D. KIMMEL, OF DAYTON, OHIO.

TROLLEY WHEEL.

Application filed June 18, 1923. Serial No. 646,021.

*To all whom it may concern:*

Be it known that I, JESS D. KIMMEL, a citizen of the United States, residing in Dayton, in the county of Montgomery and State of Ohio, have invented certain new and useful Improvements in Trolley Wheels, of which the following is a specification, reference being had therein to the accompanying drawings.

This invention relates to trolley wheels for electric railway cars.

The object of the invention is to provide an improved trolley wheel which will operate in sliding engagement with the trolley, as a trolley shoe, thus to obtain better electrical contact relation with the trolley, when the car is traveling in the forward direction and which will rotate freely on the trolley when the car is backed up, thus avoiding the gripping action on the trolley and interference with the overhead electrical connections which is a common fault of the trolley shoes.

To this end the improved trolley wheel is provided with simple automatic means for locking the wheel against rotation in clockwise direction, thus causing the wheel to slide on the trolley in the forward direction of the car and which will release the wheel for free rotation on the trolley in the opposite direction.

The trolley wheel and parts are adapted to be used in connection with ordinary trolley harps, and thus make possible a substantial saving in cost in the replacement of equipment.

In the acompanying drawings:

Fig. 1, is a side elevation of the trolley wheel as assembled in an ordinary trolley harp:

Fig. 2, is a rear elevation of the assembly shown in Fig. 1, a portion of the trolley wheel being broken away to show the locking mechanism:

Fig. 3, is a side elevation of the trolley wheel and locking mechanism with the harp removed;

Figs. 4 and 5, are detail views of the locking pawls.

The trolley head, as here shown, consists of the harp—1, wheel—2, and locking pawls—3, the trolley wheel being shown in normal relation to the trolley wire—4. The trolley harp is the usual type in common use, the construction of which is well understood in this art.

The improved trolley wheel is of the usual construction with the addition of a series of laterally projecting lugs—5 which are equally spaced one from another in circular arrangement on opposite sides of the wheel. The hub of the wheel is provided on both sides of the wheel with an annular groove —6, one of the locking pawls—3, being suspended in each groove by means of an apertured extension—7 of the pawl, the aperture being of the required dimension at one end thereof to permit the pawl to be slipped over the hub into the groove—6, the opposite end of the aperture, adjacent the hub, being of smaller dimension whereby to retain the pawl in the groove and to prevent lateral displacement thereof relative to the hub.

Pawls—3 are normally suspended downwardly, substantially as illustrated in Figs. 1 and 2, the end of each pawl being provided with a laterally elongated tooth—8 which is adapted to engage one of the lugs—5 and the trolley harp, thus to prevent clockwise rotation of the trolley wheel when the car travels in the forward direction, whereby to obtain better electrical contact relation by causing the wheel to slide on the trolley as a shoe.

When the direction of travel of the car is reversed, when the car is backed, the trolley wheel will be free to rotate in counter-clockwise direction, as each pawl—3 will then be engaged successively by lugs—5 and carried upwardly with the movement of the wheel to a position generally indicated by the dotted outline of the pawl in Fig. 3, where the pawl will shift inwardly on the hub of the wheel and fall free of the lugs by gravity movement, the pawls being curved on their rear edges to provide for an easy escapement movement over the lugs, the trolley wheel being free to rotate, there will be no interference of the wheel with the overhead electrical connections.

As shown in Figs.—1 and—2 stop lugs—9 may be provided on the trolley harp to engage pawls—3 and limit their upward movement to insure free rotation of the wheel by preventing frictional overthrow of the pawls which might otherwise result under abnormal conditions of wear of the parts.

As illustrated by dotted outline in Fig. 3 the groove of the trolley wheel may be divided into a series of straight line contact sections to increase the area of contact surface of new wheels, thus to move nearly approximate the contact relation to the trolley of a trolley shoe. On trolley wheels having the usual circular groove, contact surfaces of increased area will develop with the wear and adjustments of the wheel.

Having described my invention, I claim:

1. A trolley wheel including in combination with a series of lugs arranged on the side of the wheel, a pawl supported on the hub of said wheel and adapted to engage one of said lugs and the trolley harp whereby to prevent rotation of the wheel in one direction.

2. A trolley wheel including in combination with a series of equally spaced lugs in circular arrangement on the side of the wheel, a gravity pawl supported on the hub of said wheel and adapted to engage one of said lugs and the trolley harp whereby to prevent rotation of the wheel in one direction.

3. A trolley wheel including in combination with a fixed stop on said wheel, a pawl supported on the hub of the wheel and adapted to move rotatably and radially relative to the hub into engagement with stop and the trolley harp whereby to prevent rotation of the wheel in one direction.

4. A trolley wheel including in combination with a stop on said wheel, a pawl supported on the wheel and adapted to engage said stop and the trolley harp to prevent rotation of the wheel in one direction, and to be moved out of engagement with said parts upon rotation of the wheel in the opposite direction.

5. A trolley wheel including in combination with a stop on said wheel, an annular groove in the hub of the wheel, a pawl supported in said groove and adapted to move rotatably and radially relative to the hub into engagement with said stop and the trolley harp whereby to prevent rotation of the wheel in one direction.

In testimony whereof, I affix my signature.

JESS D. KIMMEL.